United States Patent
Naka et al.

(10) Patent No.: US 7,865,061 B2
(45) Date of Patent: Jan. 4, 2011

(54) RECORDING APPARATUS FOR RECORDING DATA TO RECORDING MEDIUM WITH A PLURALITY OF CLUSTERS

(75) Inventors: Akiteru Naka, Inagi (JP); Yojiro Tagawa, Narashino (JP); Katsumi Iijima, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 994 days.

(21) Appl. No.: 11/200,933

(22) Filed: Aug. 10, 2005

(65) Prior Publication Data
US 2006/0039678 A1 Feb. 23, 2006

(30) Foreign Application Priority Data
Aug. 23, 2004 (JP) .............................. 2004-242228

(51) Int. Cl.
H04N 5/91 (2006.01)
H04N 7/00 (2006.01)
H04N 5/93 (2006.01)
G11B 27/00 (2006.01)

(52) U.S. Cl. ............................. 386/95; 386/46; 386/52; 386/55; 386/125; 386/126

(58) Field of Classification Search .................. 386/52, 386/55, 68, 95, 46, 125–126
See application file for complete search history.

(56) References Cited

U.S. PATENT DOCUMENTS

| | | | |
|---|---|---|---|
| 5,596,564 A * | 1/1997 | Fukushima et al. ............ 386/70 |
| 6,411,770 B1 * | 6/2002 | Ito et al. ........................ 386/46 |
| 6,701,061 B2 * | 3/2004 | Karasudani et al. ............ 386/46 |
| 2002/0009294 A1 * | 1/2002 | Nishimura ..................... 386/124 |
| 2003/0215222 A1 * | 11/2003 | Kawasaki ....................... 386/125 |
| 2003/0225952 A1 * | 12/2003 | Murakami ...................... 710/200 |

FOREIGN PATENT DOCUMENTS

JP 2003-52006 2/2003

* cited by examiner

Primary Examiner—Thai Tran
Assistant Examiner—Daquan Zhao
(74) Attorney, Agent, or Firm—Canon U.S.A., Inc. IP Division

(57) ABSTRACT

A recording apparatus includes a recording unit configured to record moving image data including a plurality of frames on a recording medium. The recording medium includes a plurality of clusters. The apparatus also includes an editing unit of the moving image data, a setting unit configured to optionally set the editing unit, a management information processing unit configured to generate management information including link information indicating a cluster number of the moving image data to be reproduced next with respect to a plurality of clusters having the moving image data recorded thereon, and a control unit configured to control the recording unit to record a front frame of each editing unit in the moving image data on an area beginning with a cluster of the recording medium based on the editing unit set by the setting unit.

8 Claims, 18 Drawing Sheets

FIG.3

| CLUSTER NUMBER | VALUE |
|---|---|
| 0 | FFF8h | ~201
| 1 | FFFFh |
| 2 | 0003h |
| 3 | 0004h |
| 4 | 0005h |
| 5 | 0006h |
| 6 | FFFFh |
| 7 | 0000h |
| ⋮ | ⋮ |
| 124 | 0000h | ~202
| 125 | 0000h |
| 126 | 0000h |
| 127 | 0000h |

FIG.4

| FILE NAME MVI_0001 | EXTENSION AVI | ATTRIBUTE | RESERVATION | UPDATE DATE AND TIME | FRONT CLUSTER NUMBER 10 | FILE SIZE |
|---|---|---|---|---|---|---|
| 251 | 252 | 253 | 254 | 255 | 256 | 257 |

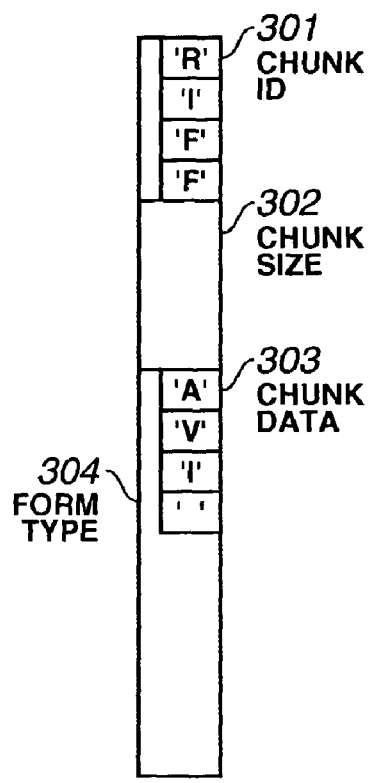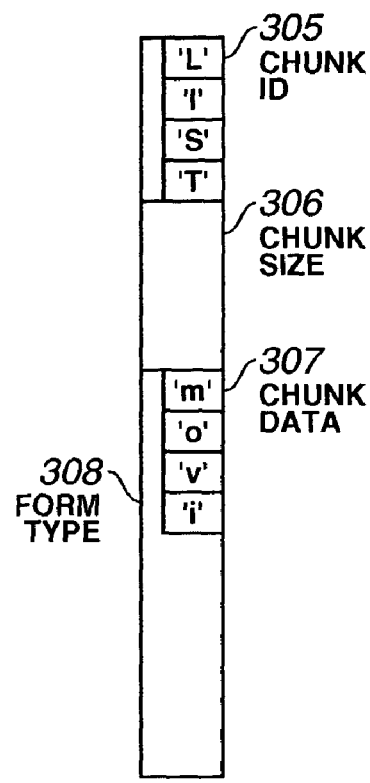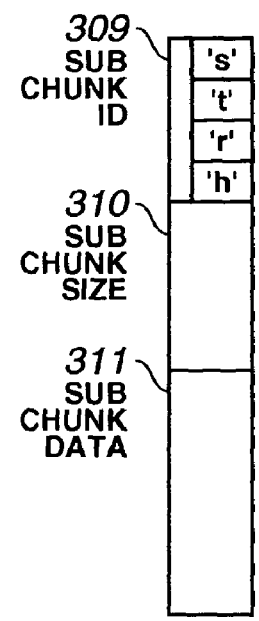
FIG.5A  FIG.5B  FIG.5C

FIG.14

| EDITING UNIT | IS THIS USABLE? | |
|---|---|---|
| | BEFORE CHECKING | AFTER CHECKING |
| 1sec | OK | NG |
| 5sec | OK | NG |
| 10sec | OK | OK |
| 30sec | OK | OK |
| 60sec | OK | OK |

~651

RECORDING APPARATUS FOR RECORDING DATA TO RECORDING MEDIUM WITH A PLURALITY OF CLUSTERS

BACKGROUND OF THE INVENTION

1. Field of the Invention

The present invention relates to a recording apparatus, and particularly an apparatus for recording moving image data to a recording medium configured of a plurality of sectors.

2. Description of the Related Art

In recent years, moving image data captured with a digital camera or a digital video camera are recorded on a recording medium such as a CF (CompactFlash®) card or the like in accordance with Audio Visual Interleaving file (hereinafter referred to as AVI file) format or MPEG (Moving Picture Experts Group) format to enjoy a reproduced image. Further, the capacity of the recording medium has been increasing year by year, and an amount of time to record a moving image file is becoming longer. Consequently, a video camera capable of performing an editing operation has also come on the market, which can reproduce the moving image data immediately after photographing and when an unnecessary portion is found, delete the unnecessary portion on the spot.

For instance, in the case of deleting a part of the AVI file, the video camera performs the following processing.

First, on a memory card, image and audio data are read from an address having valid data subsequent to a portion to be deleted, and are stored in the memory of a video camera body. Further, the data stored in the memory are written from the front (initial) address of the deleted data on the memory card. In this manner, the reading and writing process of data from and to the memory card is repeated in a predetermined amount of data as a unit, and finally, a file size of the AVI file is set, except for an area to be deleted.

In the case of deleting a part of the AVI file in this manner, the reading and writing process of data from and to the memory card is thus repeated.

Accordingly, there arises a problem in that as the file size becomes larger, an amount of time consumed by edit processing becomes longer too.

With respect to this problem, Japanese Patent Application Laid-Open No. 2003-52006 discloses a method for reducing the writing and reading process of data to and from the recording medium in the case of deleting a part of data.

In Japanese Patent Application Laid-Open No. 2003-52006, first, a cluster including only a frame to be partially deleted is deleted by a file system.

Next, dummy data are written into a recording area of the deleted data in the cluster including data to be deleted as well as data not to be deleted. In a case where the dummy data having one cluster or more are inserted, the data not to be deleted are moved. Then, the cluster including only the data to be deleted is set as an unused area on the file system. By the above processing, work for reading and writing of data to the recording medium is decreased, and time consumed by the edit processing is reduced.

However, in Japanese Patent Application Laid-Open No. 2003-52006, when the dummy data having one cluster or more are present, reading and writing of data to the memory card occurs since the valid data has to be moved. As a result, the above patent reference has a problem in that the editing operation consumes much time.

SUMMARY OF THE INVENTION

The present invention is directed to a recording apparatus and an image pickup apparatus.

The present invention is also directed to allowing a high speed editing operation even in a case where moving image data has been recorded on a recording medium including a plurality of clusters.

In one aspect of the present invention, a recording apparatus includes a recording unit configured to record moving image data including a plurality of frames on a recording medium including a plurality of clusters, an editing unit of the moving image data recorded on the recording medium; a setting unit configured to optionally set the editing unit, a management information processing unit configured to generate management information including link information indicating a cluster number of the moving image data to be reproduced next with respect to a plurality of clusters having the moving image data recorded thereon, and a control unit configured to control the recording unit to record a front (initial) frame of each editing unit in the moving image data on an area beginning with a front (initial) of a cluster of the recording medium based on the editing unit set by the setting unit.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram showing a FAT area.

FIG. 4 is a diagram showing a directory entry.

FIGS. 5A, 5B and 5C are diagrams showing a chunk of an AVI file in RIFF (Resource Interchange File Format) format.

FIG. 14 is a diagram of a table for managing an editing unit.

DETAILED DESCRIPTION OF THE EMBODIMENTS

Embodiments of the invention will be described in detail below with reference to the drawings.

Figure 1:
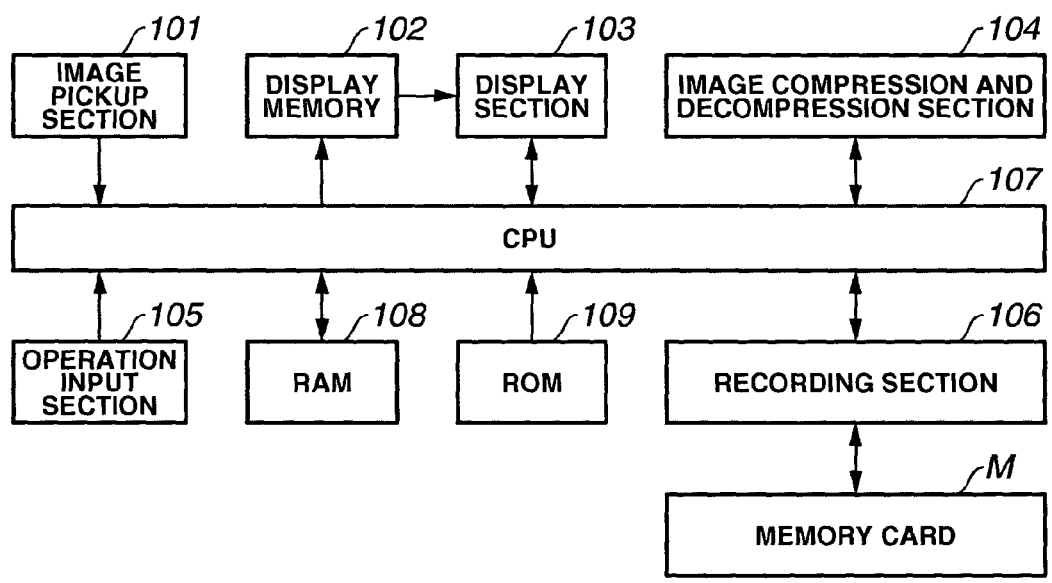
FIG. 1 is a block diagram showing an image pickup apparatus according to an embodiment of the present invention.

FIG. 1 is a block diagram showing the configuration of a digital camera in an embodiment of the present invention.

An image pickup section 101 is provided with a photographic lens and an image pickup device, and outputs an image signal of an object. An image display memory 102 temporarily holds a video signal to display an image. Reference numeral 103 denotes a display section such as a liquid crystal display device. An image compression and decompression section 104 compresses and inversely decompresses image data outputted from the image pickup section 101 using compression algorithm such as JPEG. An operation input section 105 includes a cross key, a button and the like.

A recording section 106 writes data into a detachably attachable memory card M. Reference numeral 107 denotes a control section (hereinafter referred to as CPU) such as a microprocessor for controlling an entire digital camera. A RAM 108 temporarily holds data outputted from the image pickup section 101 and others. A ROM 109 stores a program and data for controlling the entire digital camera. The RAM 108 stores information about intervals (hereinafter referred to as edit interval) at which partial deletion can be performed in editing an image and audio file. The ROM 109 stores the program for recording and editing the image and audio file.

Figure 2:
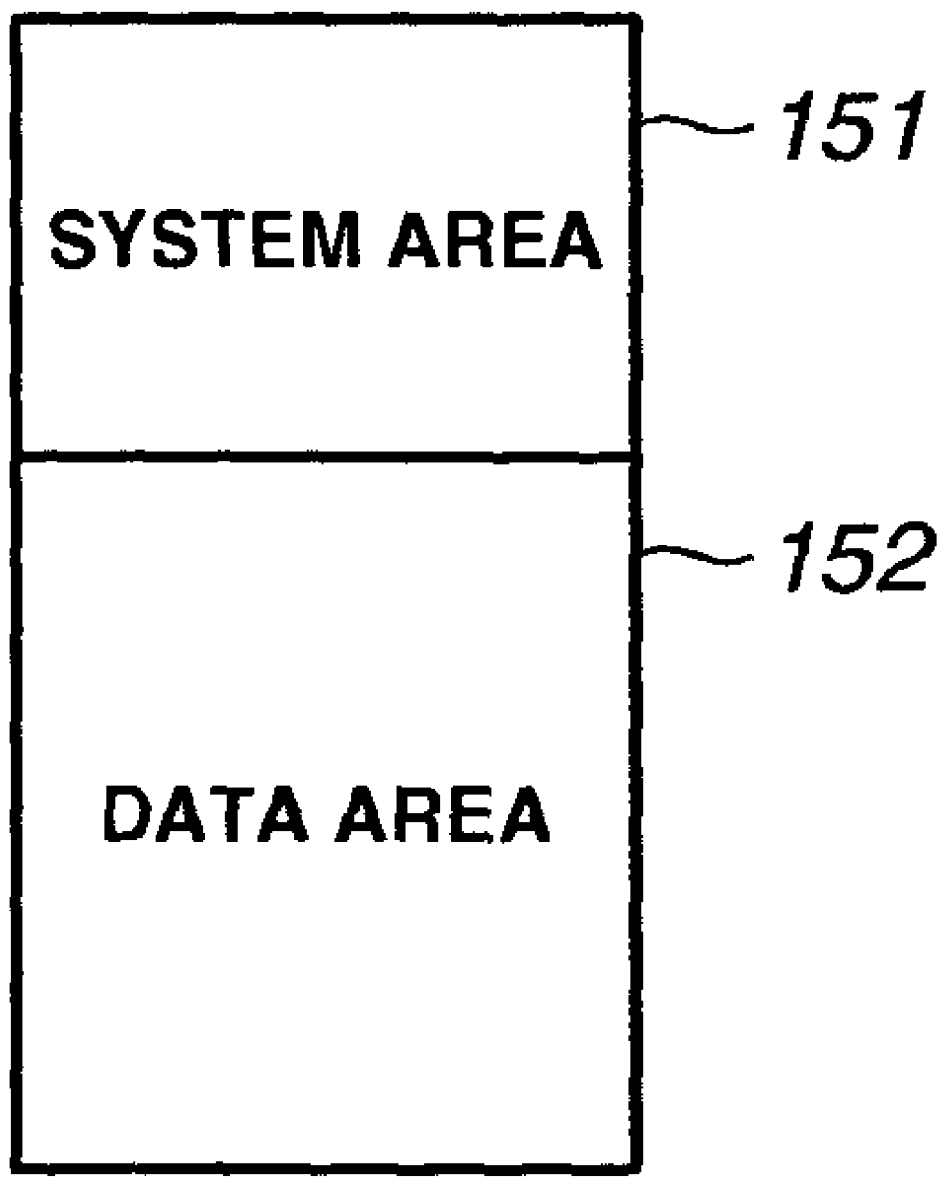
FIG. 2 is a diagram showing a FAT (File Allocation Table) file system.

FIG. 2 is a conceptual diagram in the case of formatting the memory card M in accordance with a FAT file system.

A recording area includes a system area 151 and a data area 152. The system area 151 is further constituted by three areas including (1) a boot sector area for designating a program to load an OS, and defining the structure of the system area and the data area; (2) a FAT area for storing the state of a cluster present in the data area; and (3) a root directory area for managing a file and subdirectory information present at a root directory in a recording medium.

Also, on the data area 152, information about data in a file and a subdirectory are stored in units called a cluster. The cluster is managed by a cluster number. A cluster number 2 is assigned to a first cluster on the recording medium, and hereafter a number is assigned in ascending numeric order.

FIG. 3 is a conceptual diagram showing a FAT area.

Each item in the FAT area starts from zero and is associated in such a manner so as to correspond to the cluster in the data area in a one to one relation. Reference numeral 201 indicates first two items in the FAT area, and is used specifically as a format identifier or the like. Reference numeral 202 indicates each item from 2 to n after a second item, and link information showing the state of the cluster is written thereinto. That is, in a case where image and audio data are recorded on the cluster, a number of the cluster which stores the image and audio data to be reproduced next is recorded there. If a cluster is the last cluster in one file, a predetermined value indicating the last file, for example FFFFh, is entered. Further, in the case of a free cluster on which the image and audio data are not recorded, a specific value, for example 0000h, is entered. Also, in the case of a defective cluster, a specific value is entered. At the time of reproduction, the link information in the FAT area is checked, and the image and audio file recorded across a plurality of clusters can be reproduced.

FIG. 4 is a conceptual diagram showing a directory entry.

An area 251 records the character string of a name, excluding an extension, to be used for a file and a directory. An area 252 records the character string which is the extension of the file. An area 253 records attribute information about the file and the directory. Reference numeral 254 is a reservation area. An area 255 records the time when the file and the directory are created or updated. When the area 255 follows a front (initial) cluster, data can be acquired to the last file by tracing the entry of the FAT. Reference numeral 256 is an area for recording a front cluster number where the file, the directory and others are present. An area 257 records a file size in a byte size.

An AVI file is configured in RIFF format. The RIFF format is a file format for combining various resources into one file, and has a feature such that an entire configuration is not changed even if a new format is added, thus maintaining a basic configuration. The file format in RIFF format is configured such that a block named as a chunk constitutes one unit. Every chunk is classified into a RIFF chunk, a LIST chunk, or a sub chunk. The RIFF chunk and the LIST chunk can recursively include the LIST chunk or the sub chunk in the data area.

FIG. 5A is a conceptual diagram of the RIFF chunk. A chunk ID 301 identifies a chunk type. On the RIFF chunk, the character string of RIFF is set to first four bytes. In addition, a first chunk of the AVI file needs to be the RIFF chunk. Chunk data 304 is a data section of the RIFF chunk. A chunk size 302 indicates the byte length of the chunk data 304. A form type 304 is entered in the front (initial) four bytes of the chunk data 303, and on the AVI file, the character string of AVI is entered.

FIG. 5B is a conceptual diagram of the LIST chunk. A chunk ID 305 identifies the chunk type. On the LIST chunk, the character string of LIST is set to first four bytes. Chunk data 307 are the data section of the LIST chunk. A chunk size 306 indicates the byte length of the chunk data 307. A form type 308 is entered in the front four bytes of the chunk data 307, and meaning of the LIST chunk is defined by the entered character string.

FIG. 5C is a conceptual diagram of the sub chunk. A sub chunk ID 309 identifies a sub chunk type. Sub chunk data 311 is the data section of the sub chunk. A sub chunk size 310 indicates the byte length of the sub chunk data 311.

Figure 6:
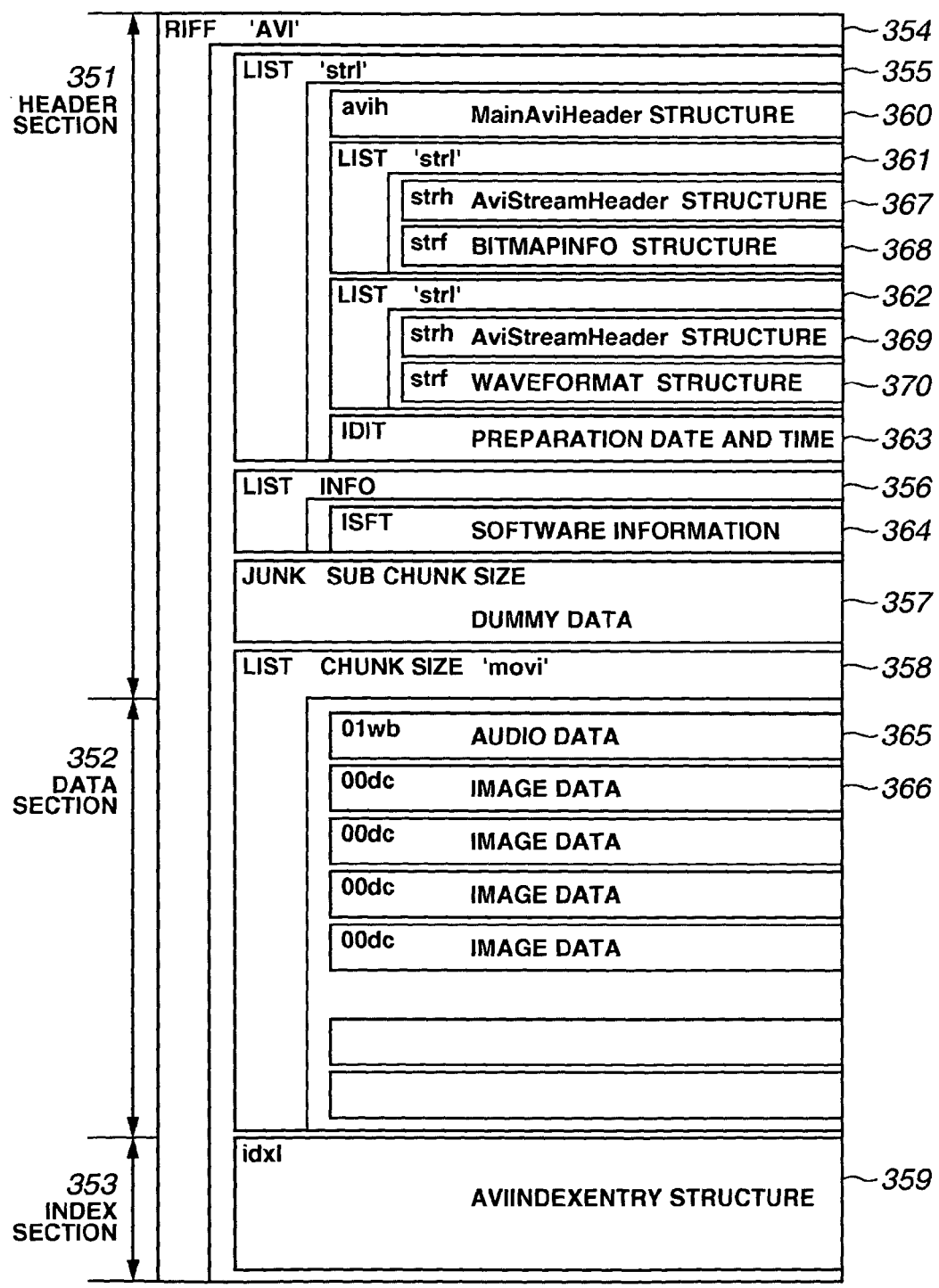
FIG. 6 is a diagram showing one example of an AVI file in RIFF format.

In FIG. 6 is shown a conceptual diagram of the AVI file in RIFF format. A header section 351 is a data area related to photographic information in the AVI file. A data section 352 is related to actual audio and image data in the AVI file. An index section 353 is an index area for cashing an offset value on the AVI file of the audio data and the image data recorded on the data section 352, as well as the byte size of the audio data and the image data. Reference numeral 354 is a RIFF chunk whose form type is 'AVI.' A chunk data area of the RIFF chunk includes the LIST chunk 355 whose form type is 'strl', the LIST chunk 356 whose form type is 'INFO', the sub chunk 357 whose sub junk ID is 'JUNK' and which has dummy data in a sub chunk data area, the LIST chunk 358 whose form type is 'movi', and the sub chunk 359 whose sub chunk ID is 'idx1'.

The JUNK sub chunk 357 packs the dummy data onto the sub chunk data area, so that the size of a header area can be changed. The LIST chunk 355 includes the sub chunk 360 whose sub chunk ID is 'avih', the LIST chunk 361 whose form type is 'strl', the LIST chunk 362 whose form type is 'strl', and the sub chunk 363 whose sub chunk ID is 'IDIT' and which has the preparation date and time in the sub chunk data area. The LIST chunk 356 includes the sub chunk 364 whose sub chunk ID is 'ISFT' and which has software information in the sub chunk data area.

The LIST chunk 358 includes the sub chunk 365 whose sub chunk ID is '01wb' and which has the audio data in the sub chunk data area, and the sub chunk 366 whose sub chunk ID is '00dc' and which has the image data in the sub chunk data area. The sub chunk having the audio data and the sub chunk having the image data appear repeatedly in response to a recorded frame number.

The LIST chunk 361 includes the sub chunk 367 whose sub chunk ID is 'strh' and which has an AviStreamHeader structure in the sub chunk data area, and the sub chunk 368 whose sub chunk ID is 'strf' and which has a BITMAPINFO structure in the sub chunk data area. The LIST chunk 362 includes the sub chunk 369 whose sub chunk ID is 'strh' and which has the AviStreamHeader structure in the sub chunk data area, and the sub chunk 370 whose sub chunk ID is 'strf' and which has a WAVEFORMAT structure in the sub chunk data area.

The audio and image data of the sub chunk included in the chunk data of the LIST chunk 358 in FIG. 6 are read in turn and are reproduced, so that the reproduction of a moving image is realized.

In FIG. 6, the sub chunk 365 including the audio data is first read when the AVI file is reproduced. Also, the sub chunk 366 including the image data in FIG. 6 is first read when the AVI file is reproduced.

Figure 7:
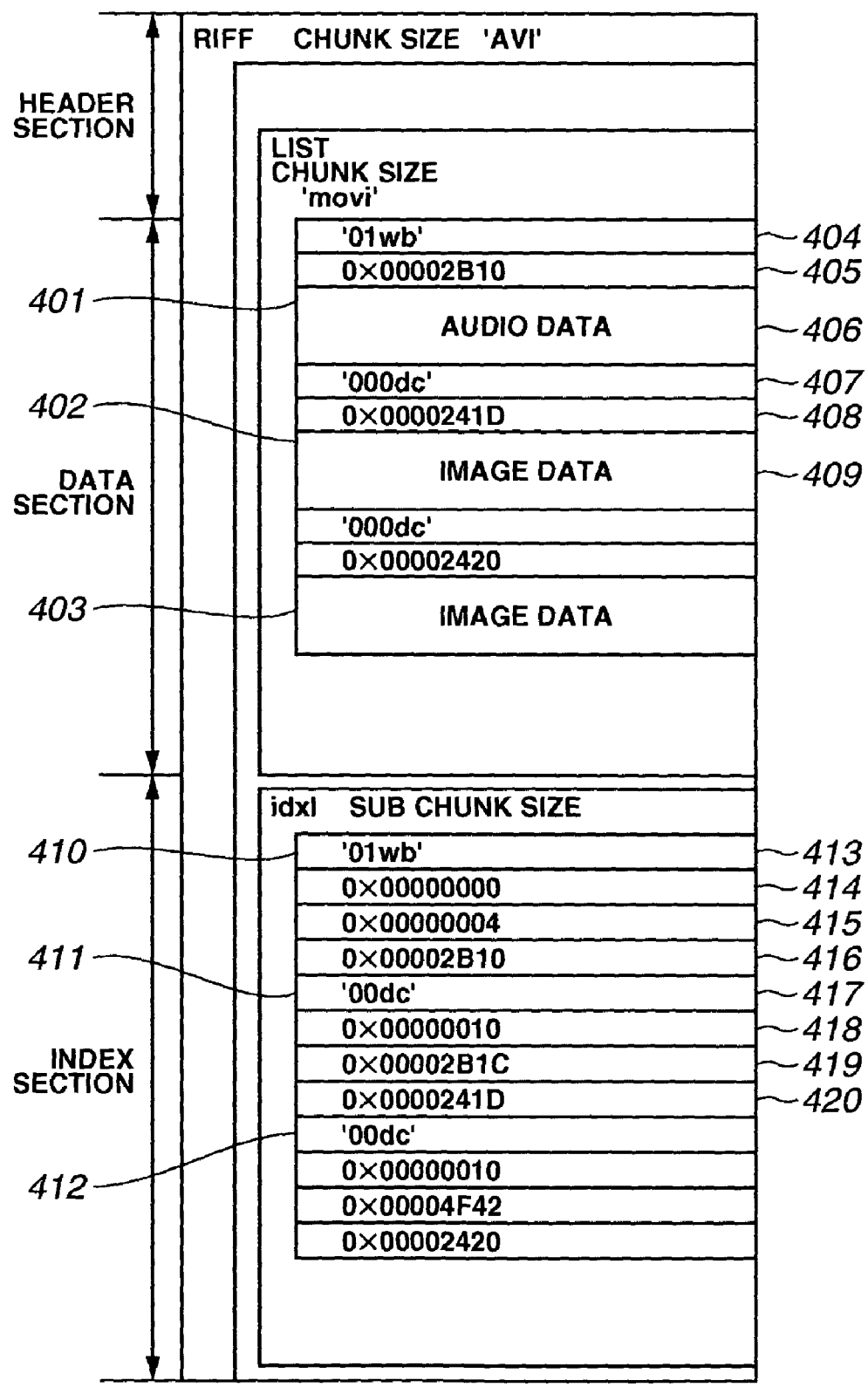
FIG. 7 is a diagram showing one example of an AVI file in detail.

FIG. 7 is a conceptual diagram illustrating the LIST chunk 358 and the sub chunk 359 in FIG. 6 in detail.

A sub chunk 401 has the audio data as the sub chunk data. A sub chunk 402 has the image data as the sub chunk data. Similarly, a sub chunk 403 has the image data as the sub chunk data subsequent to the sub chunk 402. Reference numeral 404 is the sub chunk ID of the sub chunk 401. Reference numeral 405 is the byte length of the sub chunk data of the sub chunk 401. Reference numeral 406 is the sub chunk data. Similarly, reference numeral 407 is the sub chunk ID of the sub chunk 402. Reference numeral 408 is the byte length of the sub chunk data of the sub chunk 402. Reference numeral 409 is the sub chunk data of the sub chunk 402.

The sub chunk data of the sub chunk 359 in FIG. 6 is constituted by an AVIINDEXENTRY structure, and reference numeral 410 is a first entry. Similarly, reference numeral 411 indicates a second entry, and reference numeral 412 indicates a third entry. The entry 410 corresponds to the sub chunk 401 of the LIST chunk, the entry 411 corresponds to the sub chunk 402 and the entry 412 corresponds to the sub chunk 403, in a one to one relation respectively.

Further, each entry of the AVIINDEXENTRY structure is constituted by ID, a flag, an offset from the front of the chunk data of the LIST chunk and the size of the sub chunk data, holds various kind of information about the sub chunks 401, 402 and 403, and is utilized when the AVI file is reproduced.

The entry 410 corresponding to the sub chunk 401 holds the same '01wb' as the sub chunk ID 404 in an area 413 as the ID, and holds 0x00000000 in an area 414 as the flag which indicates the audio data.

Further, the entry 410 holds the offset from the front of the chunk data of the LIST of the sub chunk 401 in an area 415, and holds the byte length of the sub chunk 401 in an area 416.

Similarly, the entry 411 corresponding to the sub chunk 402 holds the same '00dc' as the sub chunk ID 407 in the area 417 as the ID, and holds 0x00000010 in an area 418 as the flag which indicates the image data.

Further, the entry 411 holds the offset from the front of the chunk data of the LIST of the sub chunk 402 in an area 419, and holds the byte length of the sub chunk 402 in an area 420.

When reproducing the AVI file, each entry of the AVIINDEXENTRY structure such as the entry 410 or the entry 411 is utilized, so that smooth access to the audio and image data in the LIST chunk is provided.

Figure 8:
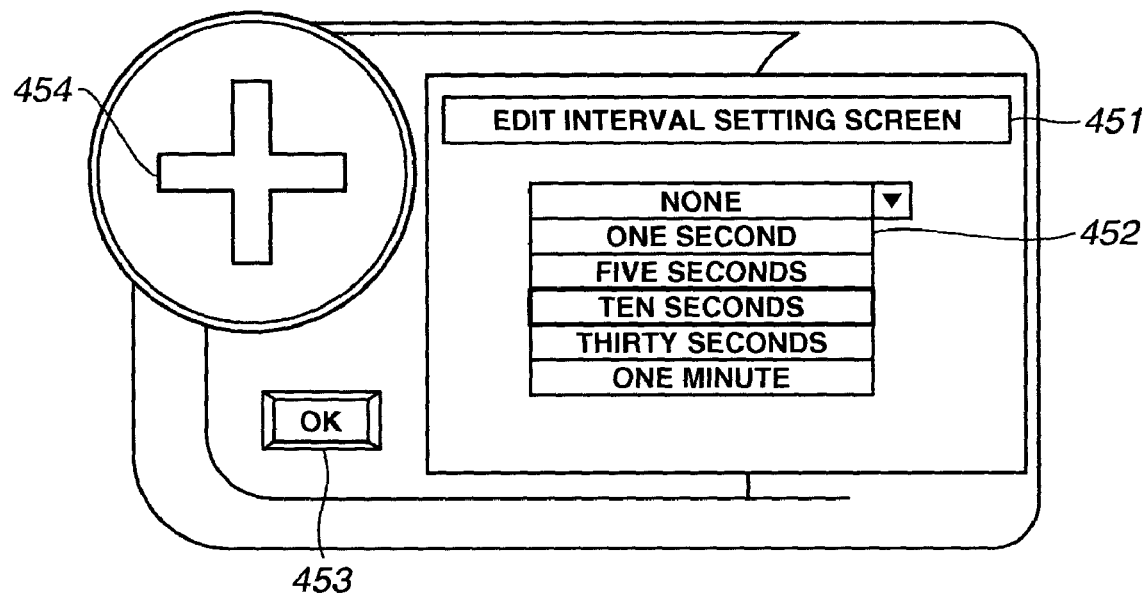
FIG. 8 is a diagram of a screen for setting edit intervals.

FIG. 8 is a diagram showing a display screen for setting an editing unit when editing the AVI file.

Users can optionally set the time of the editing unit using the display screen in FIG. 8.

Reference numeral 451 is a display part of a liquid crystal display device or the like, and is included in the display section 103 in FIG. 1. Reference numeral 452 is a user-selectable editing unit. Reference numeral 453 is a determination button to determine the editing unit. Reference numeral 454 is a cross button to select the editing unit. The determination button 453 and the cross button 454 are included in the operation input section 105 in FIG. 1.

Users can select an optional editing unit using the cross button 454, and make a determination with the determination button 453. It should be noted that, when the editing unit is not selected, as will be described later, the image and audio data are continuously recorded on the memory card M and, in recording the data, the position of a writing cluster is not set for each editing unit.

Figure 9:
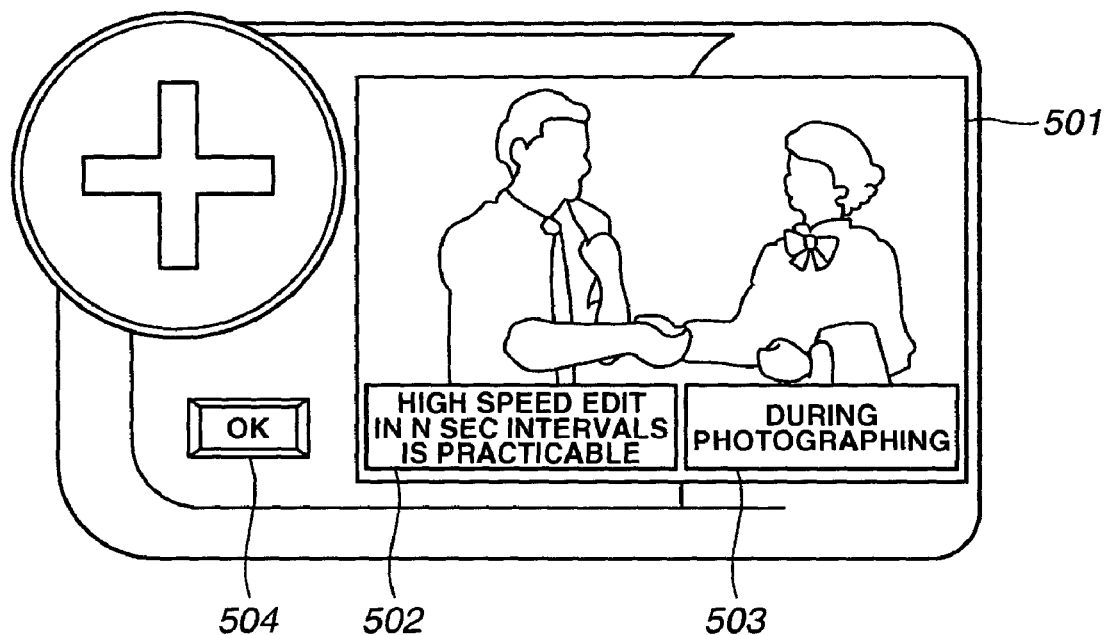
FIG. 9 is a diagram showing a display screen during recording an AVI file.

FIG. 9 is a diagram showing an example of the display screen in the display section 103 when recording the AVI file.

Reference numeral 501 is the display screen. Information 502 shows the editing unit which is set using a screen in FIG. 8. Information 503 shows the state of recording during photographing or the like. A determination button 504 starts and ends the recording. In this manner, during photographing, the display is effected such that the information 502 for the editing unit which is set in FIG. 8 is superimposed on the image being photographed.

Figure 10:
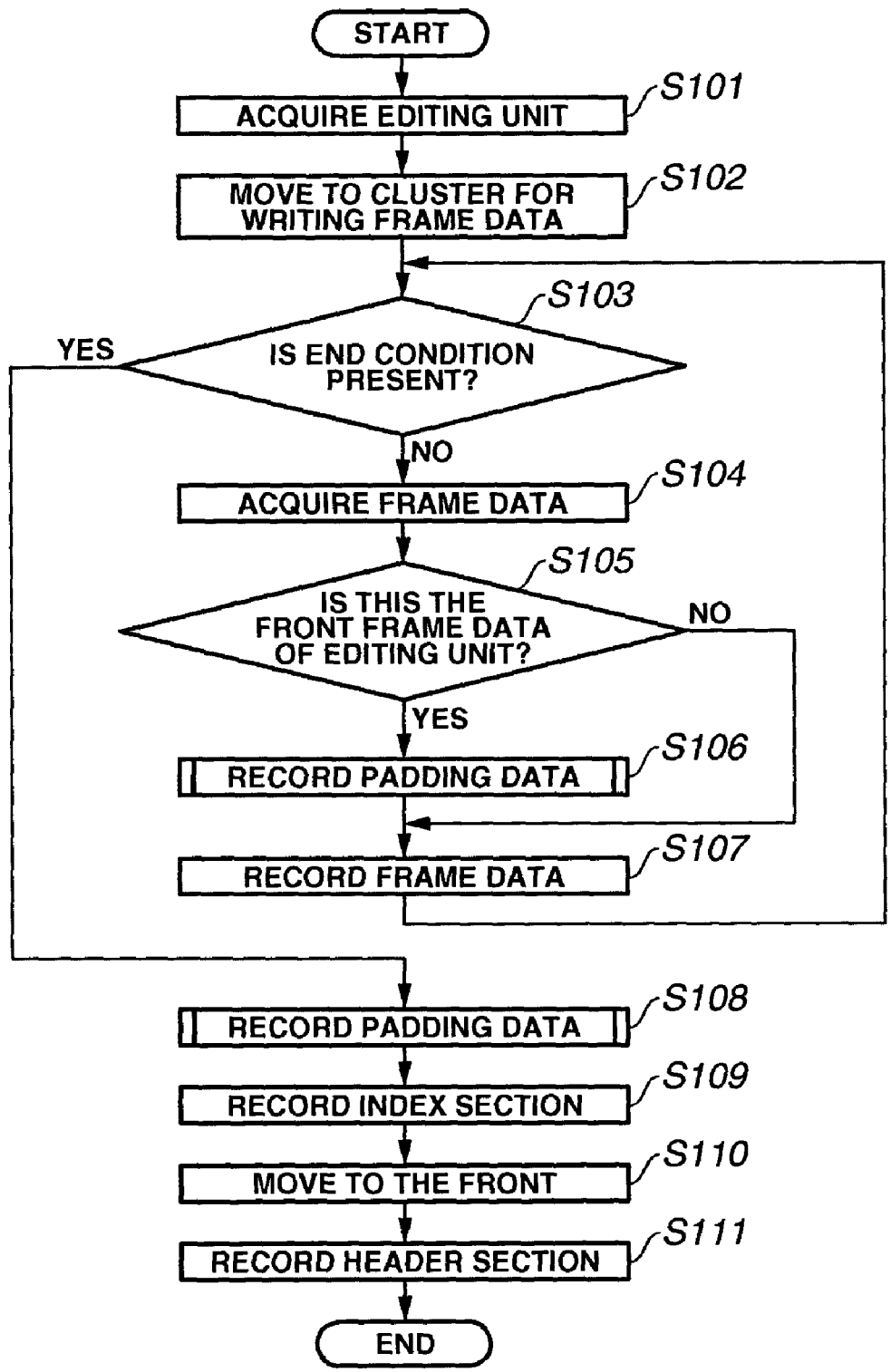
FIG. 10 is a flow chart illustrating AVI file recording processing.

FIG. 10 is a flow chart showing the operation at the time of photographing.

When a recording start and end button in the operation input section 105 is pressed, recording is started, and the sequence is executed.

In step S101, an editing unit which is set is acquired. In step S102, in the memory card M, the area of the header section recording a frame number of the image and audio file, an image size and others is freed and the process moves to the cluster at which the recording of the image and audio data starts. In step S103, whether an end condition is present or not is determined. In the step S103, if the end condition is present, the operation proceeds to step S108. In the step S103, if the end condition is not present, the operation proceeds to step S104.

In the step S104, the audio and image data are acquired. In step S105, whether the data is the front (initial) frame data of the editing unit or not is determined. In the step S105, if the image data acquired in the step S104 exactly corresponds to the front frame of the editing unit, the operation proceeds to step S106. In the step S105, if the image data acquired in the step S104 are not the front frame, the operation proceeds to step S107.

In the step S106, in the cluster recording the data of the frame immediately before the front frame, padding processing (filling processing) is performed, wherein the dummy data is recorded on the area except the recording area of the image and audio data. The recording process of padding (filling) data will be described in detail later.

In the step S107, the processing for recording the frame data of an image and audio is performed. Then the operation returns to the step S103, and the steps S103 to S107 are repeated.

A recording routine (similar to the step S106) of the padding data in the step S108 will be described in detail later. In step S109, the information for the offset and the size of the frame data in the index section is recorded. In step S110, a data writing area is moved to the area which was moved and freed in the step S102. The header section is recorded in step S111, and then the sequence ends.

Figure 11:
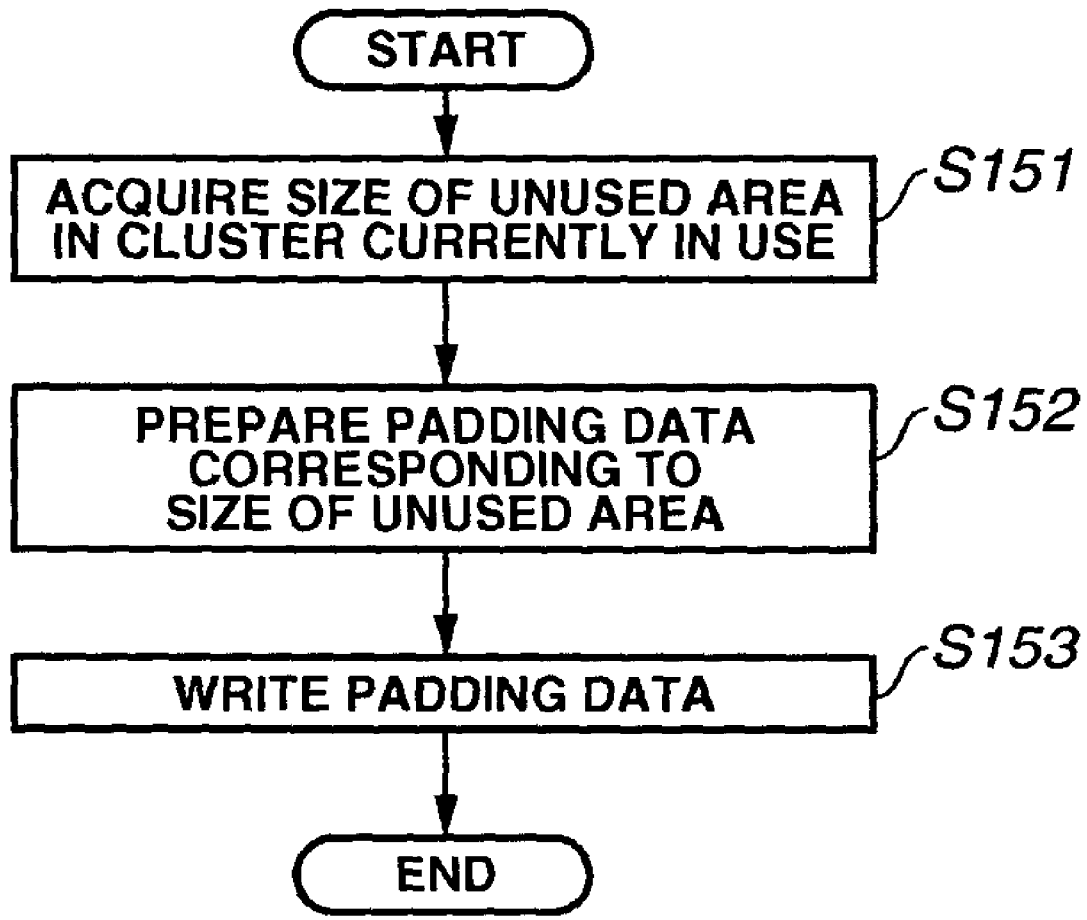
FIG. 11 is a flow chart showing a padding data recording routine.

FIG. 11 is a flow chart illustrating the recording routine of the padding data in FIG. 10.

In step S151, the size of an unused area in the cluster currently in use is acquired. In the cluster, the data of the frame immediately before the front frame acquired in step S105 is written. In step S152, the padding data, which is written into the unused area acquired in the step S151, is prepared. In step S153, the padding data is recorded on the unused area.

In this manner, in accordance with the flow chart shown in FIGS. 10 and 11, the data of the front frame of the editing unit and the index section are always recorded on the front of the cluster.

Figure 12:
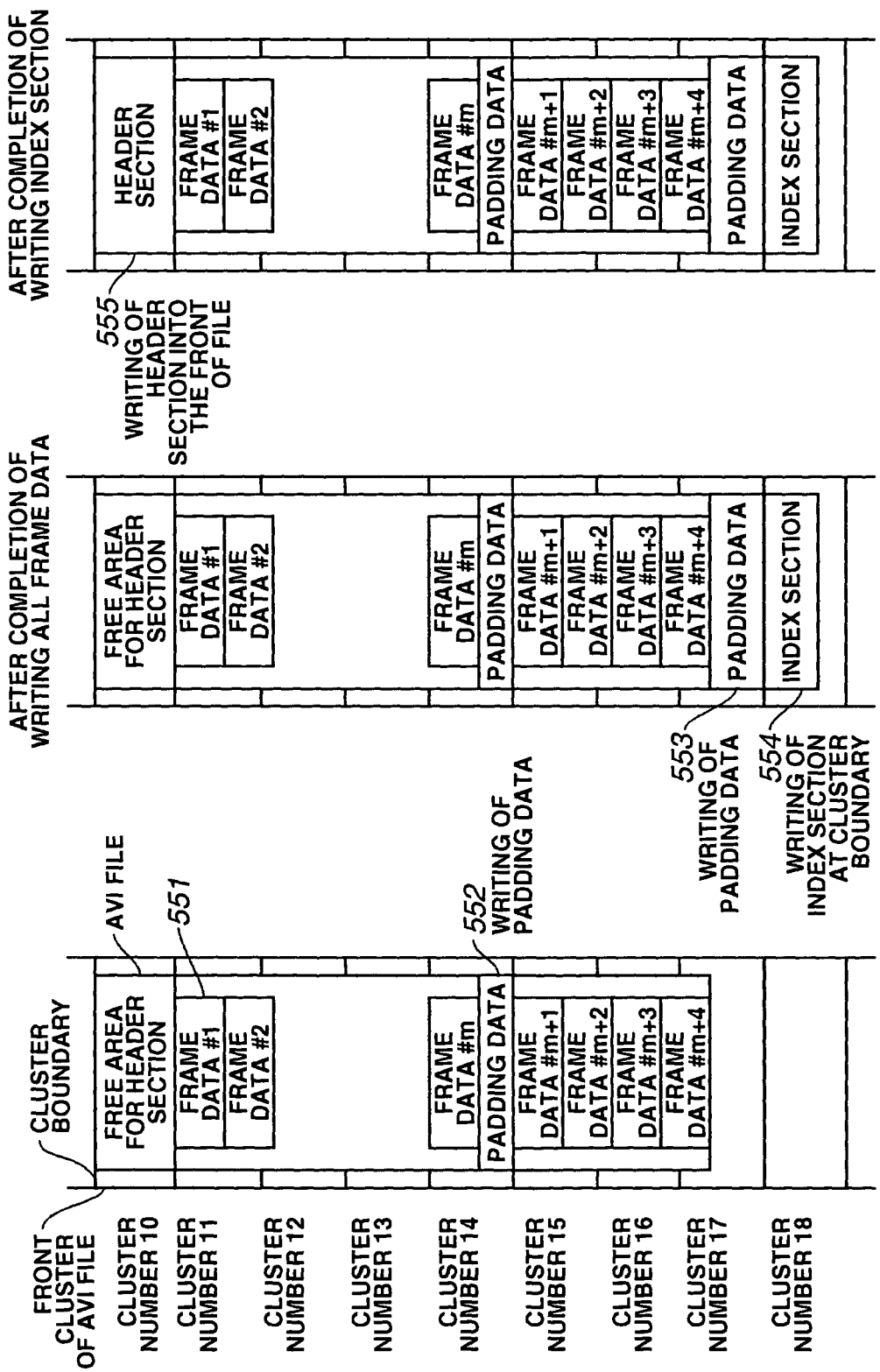
FIGS. 12A, 12B and 12C are diagrams showing an example of an AVI file recorded on a memory card.

FIGS. 12A, 12B and 12C are diagrams showing the state of the data recorded on the memory card M by the processing shown in FIGS. 10 and 11.

In FIG. 12A, reference numeral 551 shows that the front of a file is started from cluster number 10, a cluster area is freed, and frame data are recorded. Even when the header section uses a plurality of clusters, the free area is secured in advance for the header section so that the starting position of the frame data is surely the front of the cluster.

Reference numeral 552 shows the state in which the free area of the cluster currently in use is recorded with the padding data so that the data in the front frame begins from the front of the cluster when the front frame of the editing unit is acquired.

As a result, the front frame of the editing unit is recorded from the front of cluster number 15.

In FIG. 12B, reference numeral 553 shows the state of the padding data which is recorded when a recording end condition is present. Accordingly, the index section is recorded from the front of cluster number 18.

In FIG. 12C, reference numeral 555 shows that the header section of the AVI file is recorded from the front of cluster number 10.

In this manner, the header section which starts from the front, the data in the front frame of the editing unit and the index section are always recorded from the front of the cluster. Therefore, when the editing operation is carried out, the operation can be performed by operating only the FAT, without performing the reading and writing process of the image and audio data from and to the memory card, thus a high speed editing operation can be provided.

Figure 13:
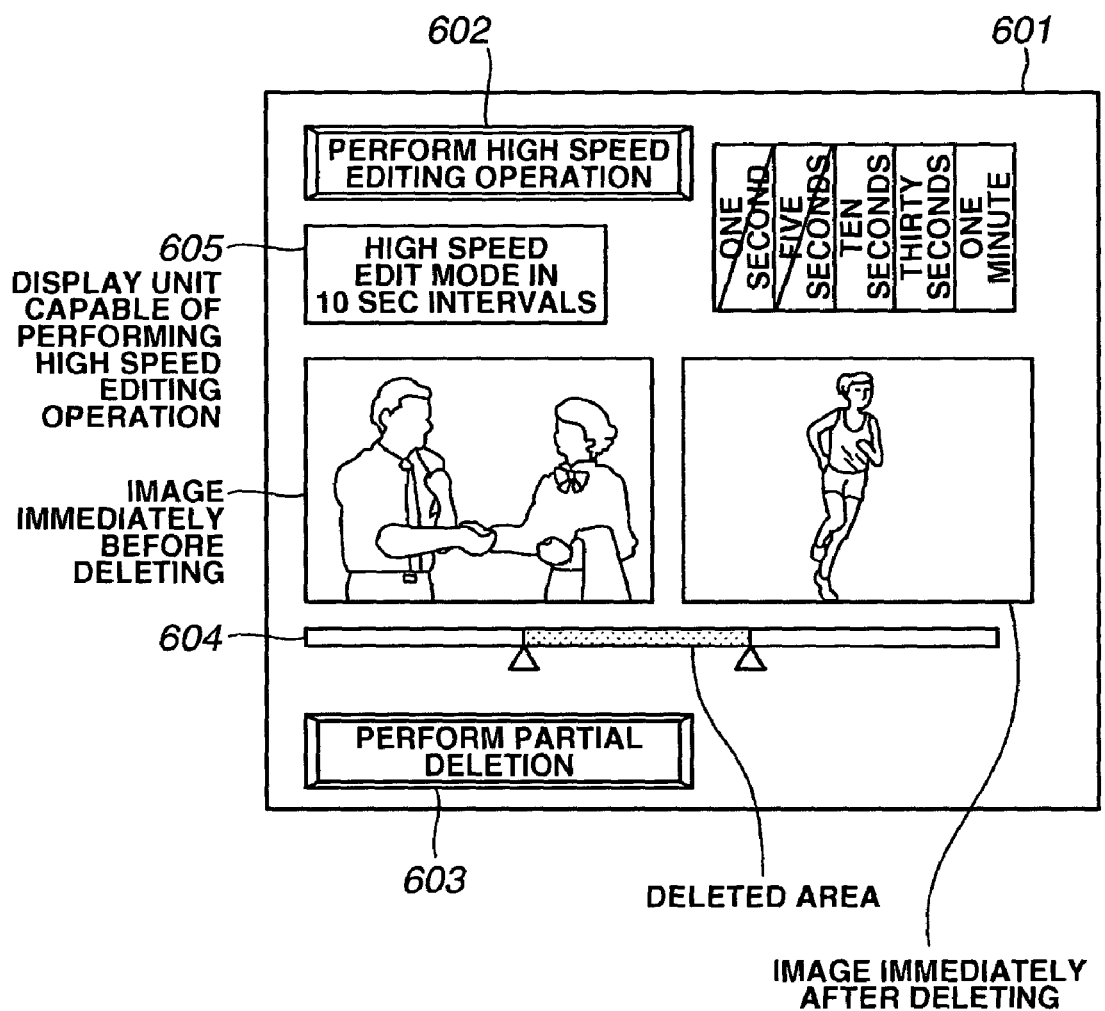
FIG. 13 is a diagram of a display screen at the time of editing an AVI file.

FIG. 13 is a diagram showing an example of the screen displayed on the display section 103 at the time of edit processing.

If users operate the operation input section 105 and set an edit mode, the screen 601 in FIG. 13 is displayed on the display section 103 by the CPU 107.

A button 602 selects a high speed editing operation. A button 603 performs partial deletion processing. An indicator 604 indicates a deleted part in a file. Information 605 shows an editing unit in the image and audio file.

FIG. 14 shows a checklist used for determining the editing unit of the file which will be edited. Reference numeral 651 shows that check result on whether editing by each editing unit is usable can be maintained. FIG. 14 shows that, as a result of making a check on a file, the editing in ten seconds can be performed at a high speed.

Then, on the basis of the checklist, information 605 for the editing unit is displayed.

Figure 15:
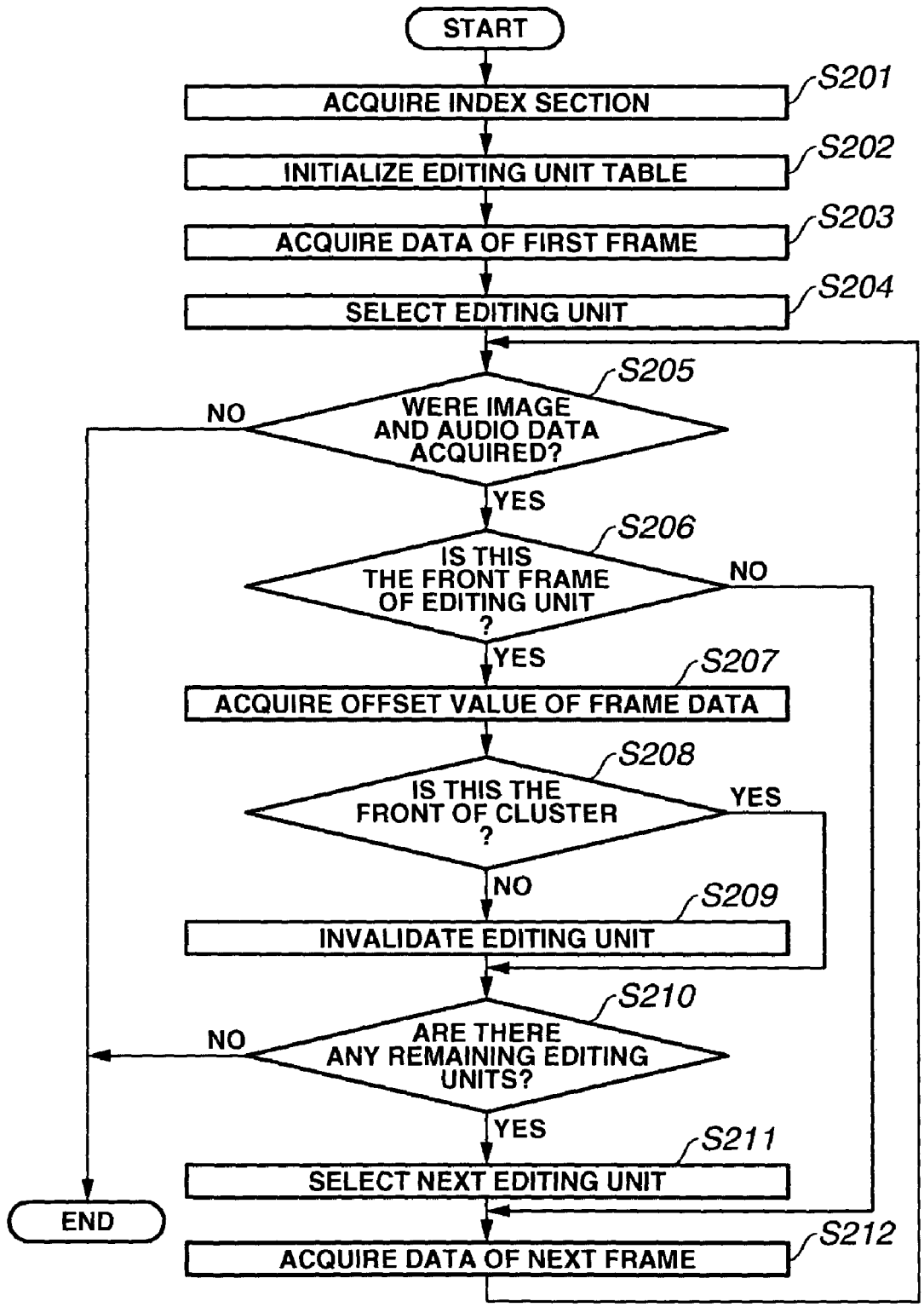
FIG. 15 is a flow chart showing a determination routine of an editing unit capable of editing at a high speed.

FIG. 15 is a flow chart showing the processing for creating the checklist in FIG. 14.

The edit mode is set and a file targeted for editing is selected, and then the sequence is performed.

In step S201, the index section in a selected image and audio file is read from the memory card, and is acquired. In step S202, an editing unit determination table is initialized. That is, in FIG. 14, every editing unit receives OK.

In step S203, first frame information is acquired from the index section. In step S204, one of the smallest editing units shown in FIG. 14 is acquired.

In step S205, whether or not frame information is acquired is determined. When the frame information is acquired in the step S205, the operation proceeds to step S206. When the frame information is not acquired in step S205, the sequence ends.

In the step S206, it is determined whether or not the data of the frame acquired the step S204 is the front frame of the editing unit acquired in the step S204. In a case where the data is the front frame, then step S206 proceeds to step S207. In a case where these are not the front frame, the step S206 proceeds to step S212.

In the step S207, on the basis of the offset value of the frame information, the offset value is acquired from the front of the file of the acquired frame. Then, on the basis of this offset value, it is determined whether or not the data of this frame is recorded on the front of the cluster in step S208. When the frame data is recorded on the front of the cluster, then step S208 proceeds to step S210.

When the frame data is not recorded on the front of the cluster, then step S208 proceeds to step S209. In step S209, the processing for invalidating the editing unit currently selected is performed. For example, when one second is selected as the editing unit, the editing unit of one second is set from OK to N.G.

In the step S210, it is determined whether or not an unchecked editing unit is present among the editing units shown in FIG. 14. When a check on all the editing units in FIG. 14 is completed, the sequence ends.

Also, in step S210, if the unchecked editing unit is present, the operation proceeds to step S211. In step S211, the editing unit to be checked next is detected from remaining editing units, and the operation proceeds to step S212. In step S212, next frame information is acquired from the index section, and the operation returns to step S204.

In this manner, the information for the editing unit capable of performing a high speed editing operation can be obtained. This result is displayed as information 605 for the editing unit in FIG. 13.

It should be noted that, even in a case where all editing units obtain N.G., display is made to that effect.

Next, the processing in which partial deletion is performed with respect to each editing unit detected in this manner will be described.

While confirming in the display screen in FIG. 13, users operate a reproduction key, a determination key or the like in the operation input section 105, and determine a part of a selected file to be deleted with the editing unit displayed on reference numeral 605 as one unit.

Figure 16:
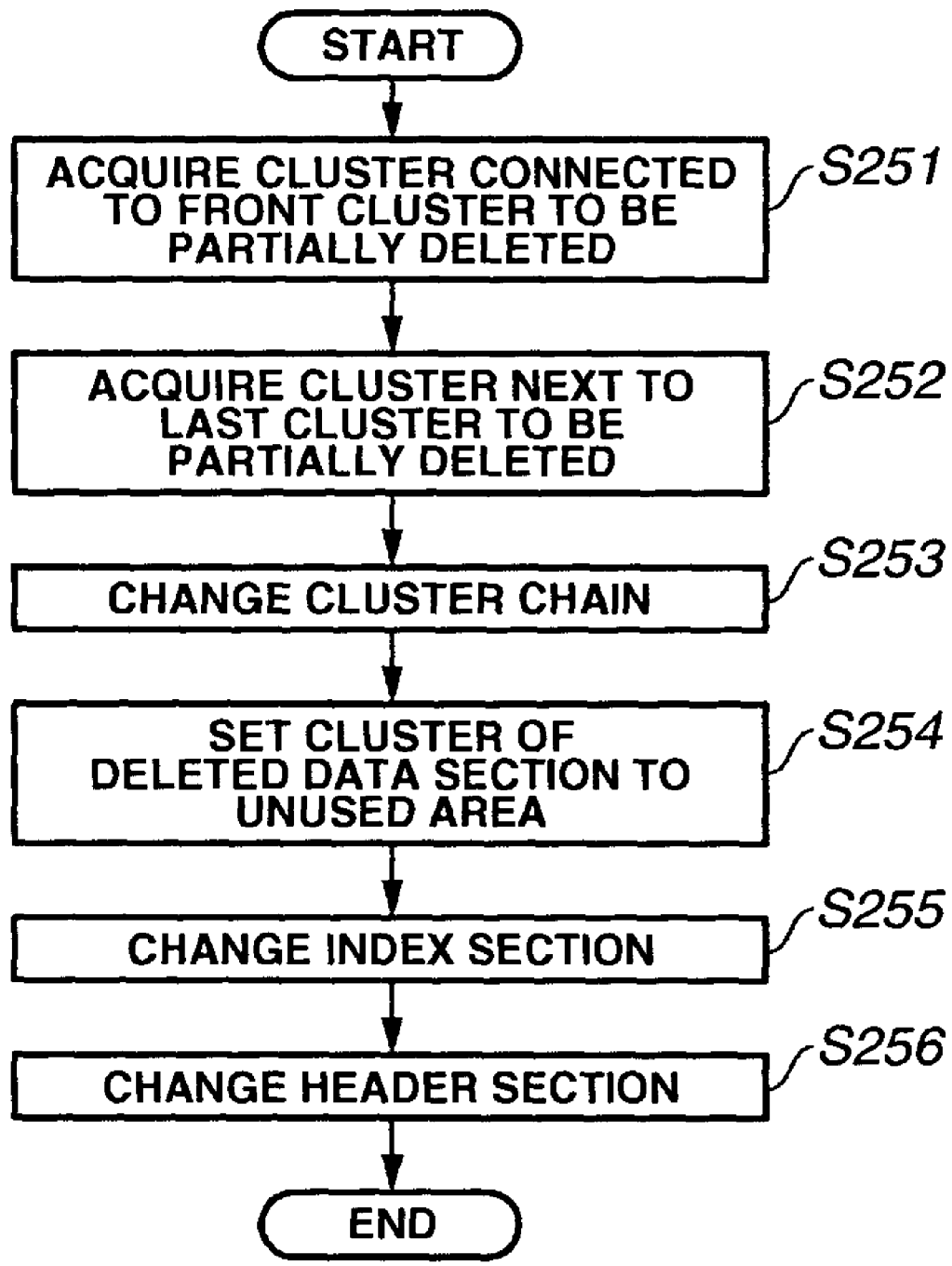
FIG. 16 is a flow chart showing processing for partial deletion.

FIG. 16 is a flowchart showing the processing in which the part to be deleted is determined as described above and thereafter the partial deletion is commanded by a partial deletion performing button 603.

In step S251, the cluster of the front portion in a selected area to be partially deleted is acquired, and then the cluster number of the image data connected to this cluster is acquired. In step S252, the cluster number of the last portion in the selected area to be partially deleted is detected, and then the cluster number of moving image data which is reproduced next to this cluster is acquired.

In step S253, a cluster chain acquired in step S251 is changed to the cluster acquired in step S252. Then, in step S254, the cluster on which the data in the deleted portion is recorded is set to the unused area.

In step S255, the entry of the index section is changed. In step S256, the information of the header section is changed. The processing in step S255 will be described in detail later.

In this manner, through simple process of changing the cluster chain and setting the cluster targeted for deletion to the unused area, the partial deletion can be realized. Consequently, it is not necessary to repeat the reading and writing processing of the data from and to the memory card M, such that time consumed by editing can significantly be reduced.

Figure 17:
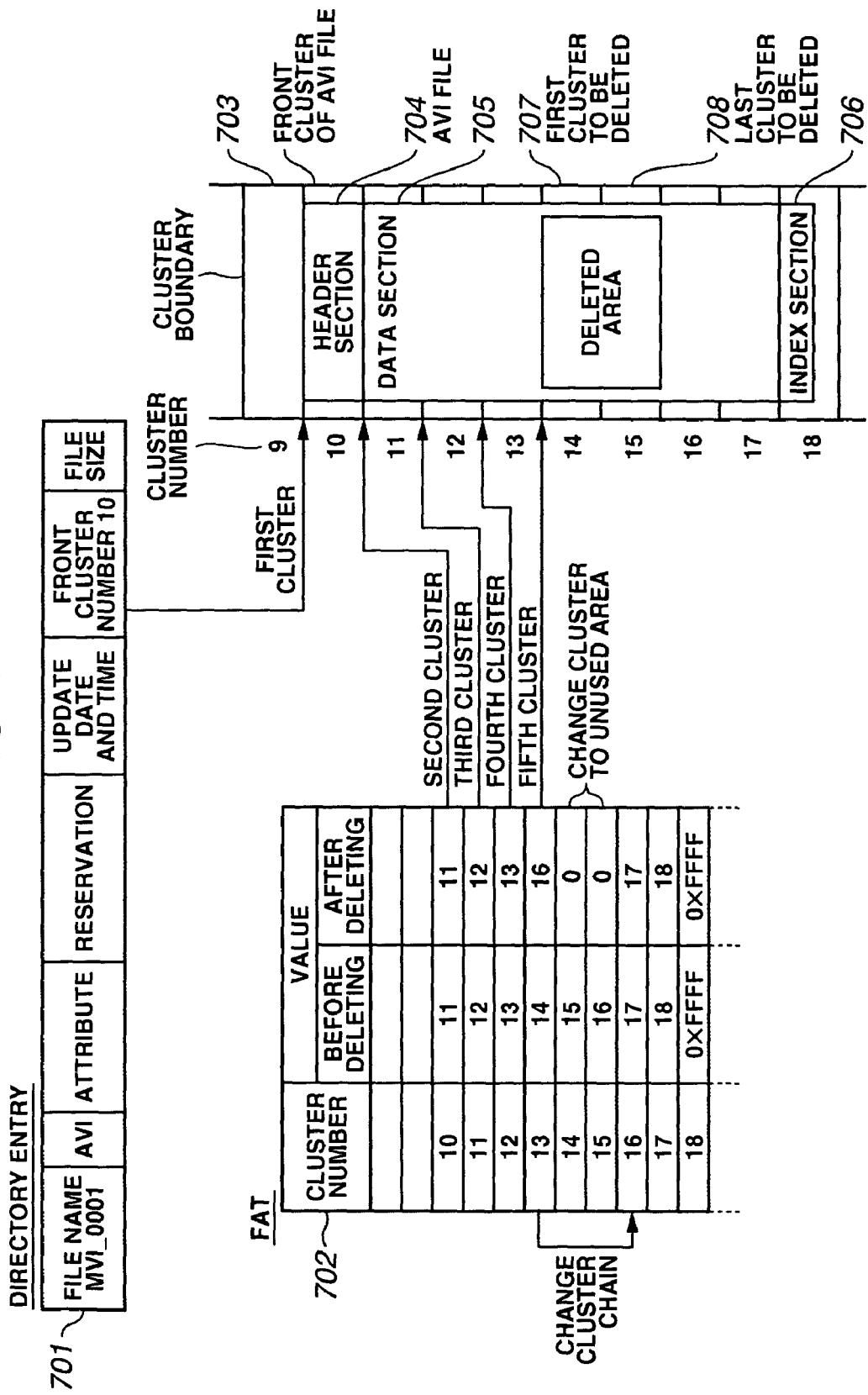
FIG. 17 is a diagram showing an example of data on a memory card resulting from partial deletion.

FIG. 17 is a diagram showing an example of the data on the memory card M resulting from partial deletion processing in FIG. 16.

RA directory entry 701 records a file name, an extension, a front cluster number of the cluster currently in use and others. A FAT 702 manages the relation between clusters of a file. Reference numeral 703 is a data area on a file system. Reference numeral 704 is the header section of the AVI file. Reference numeral 705 is the data section of the AVI file. Reference numeral 706 is the index section of the AVI file. Reference numeral 707 is the front cluster of the cluster to be deleted. Reference numeral 708 is the last cluster to be deleted. Here, the data of two clusters, cluster numbers 14 and 15, is deleted.

In FIG. 17, since the front cluster to be partially deleted is the cluster 707 of cluster number 14, a cluster connected to the cluster to be partially deleted turns out to be the cluster of cluster number 13.

Also, since the last cluster to be partially deleted is the cluster of cluster number 15, the next cluster to the last cluster to be partially deleted turns out to be the cluster of cluster number 16.

Accordingly, the FAT is rewritten in such a manner that the next cluster to cluster number 13 obtains cluster number 16, and the cluster chain is changed. Further, the clusters of cluster numbers 14 and 15 are rewritten to the unused area.

Figure 18:
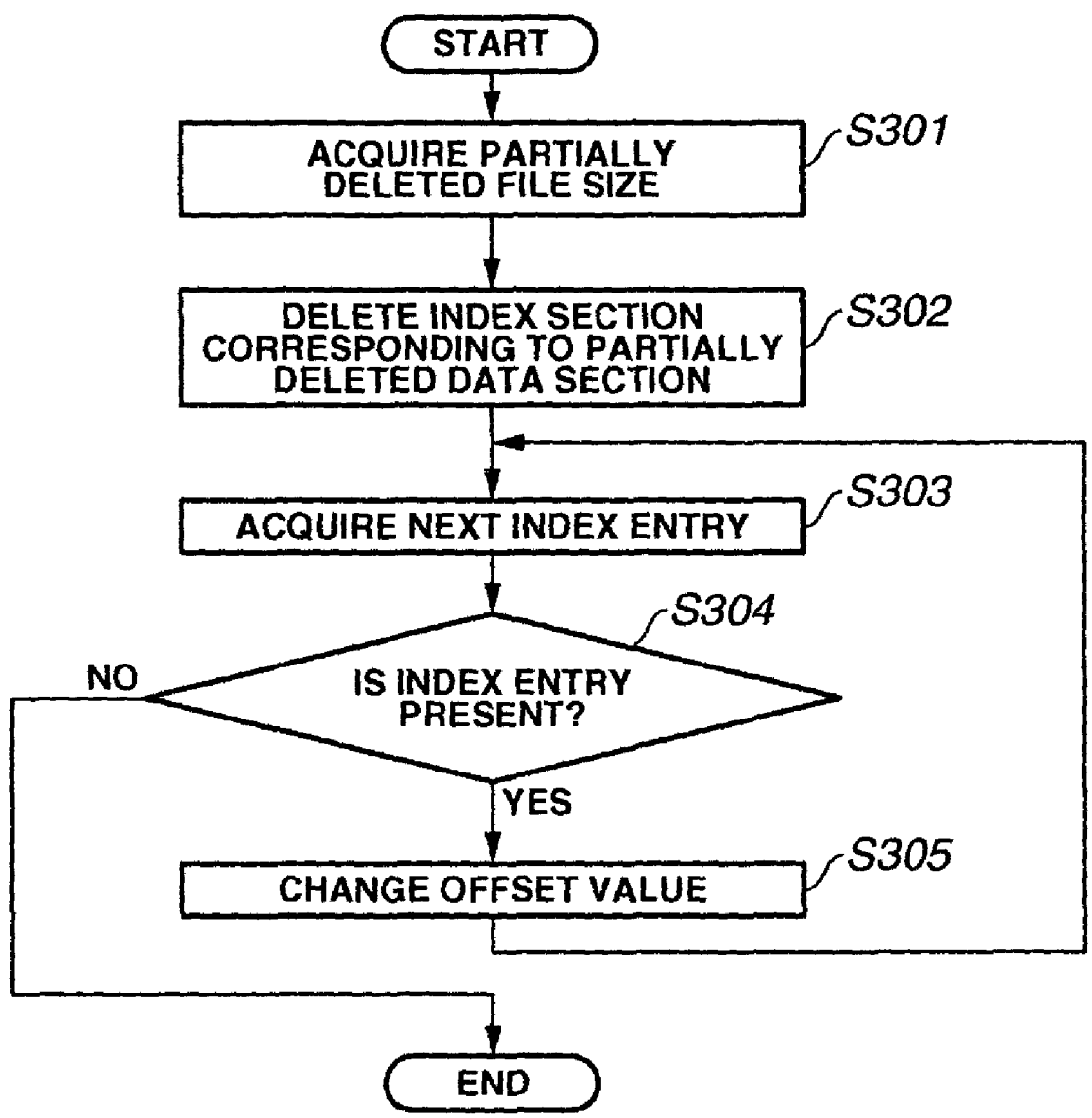
FIG. 18 is a flow chart showing an index section modification routine.

FIG. 18 is a flow chart showing processing for changing the index section in FIG. 16.

In step S301, a partially deleted file size is acquired. In step S302, an entire index entry of the index section corresponding to a partially deleted data section is deleted. In step S303, the next index entry to the deleted index entry is acquired. In step S304, it is determined whether or not the index entry is present. If the index entry can be acquired in the step S303, then step S304 proceeds to step S305. If the index entry cannot be acquired, the sequence ends in step S304. In step S305, the offset value of the index entry is changed, and then the operation returns to the step S303. Thereafter, step S303 proceeds to step S305 and the operation between step S303 and step S305 is repeated.

In this manner, as a result of performing partial deletion, a change of a data part can be made only by performing the operation of the cluster chain. Similarly, a change of an index part can be easily made.

In this manner, in the present embodiment, users optionally set the editing unit, and at the time of recording, the data of the front frame of the editing unit is recorded on the front of the cluster.

Consequently, the editing such as the partial deletion is performed with respect to each editing unit, so that the editing can be realized by simple processing such as rewriting of the cluster chain, and time consumed by the editing operation can significantly be reduced.

Note that, in the present embodiment, the padding data, which is invalid data, is written to the free area in the last cluster with respect to each editing unit as shown in FIGS. 12A, 12B and 12C. As a result, if the editing unit is shortened, a ratio of the padding data to the image and audio data becomes high, so that a ratio of needless data increases. However, high speed edit processing can be performed with shorter units.

Therefore, users may set the most suitable editing unit in consideration of the circumstances of the recording medium. For example, users look at a remaining recording capacity of the memory card M and others, and when the remaining amount is small, the editing unit is set longer.

Further, in the present embodiment, as shown in the flow chart in FIG. 15, the editing unit is detected based on the offset value actually reproduced from the memory card. However, in addition to this, for example, the information for the editing unit, which is set at the time of recording, may be stored in the header of each image and audio file and recorded on the memory card. Thus at the time of reproduction, the editing unit may be detected based on the information for the editing unit stored in the header.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-242228 filed Aug. 23, 2004, which is hereby incorporated by reference herein in its entirety.

What is claimed is:

1. A recording apparatus comprising:
    setting means for setting a unit of time length of moving image data including a plurality of frames, the unit of time length including at least one frame of the moving image data;
    a time length instruction unit configured to provide an instruction for changing the unit of time length, the setting means changing the unit of time length in accordance with the instruction for changing the unit of time length provided by the time length instruction unit;
    a recorder configured to record a moving image file including the moving image data on a recording medium including a plurality of clusters, the recorded moving image data of one moving image file including a plurality of the units of time length set by the setting means;
    a management unit configured to generate management information containing a link information indicating a cluster number of the moving image data to be reproduced next with respect to a plurality of clusters in which the moving image data are recorded; and
    a controller configured to control the recorder in accordance with the unit of time length set by the setting means so as to record a front frame of each of the plurality of units of time length included in the moving image data of one moving image file on a front of a cluster of the recording medium.

2. A recording apparatus according to claim 1, wherein the controller controls the recorder to record padding data on a free area other than a recorded area where the moving image data are recorded in a cluster which a last frame of the unit of time length of the moving image data are recorded.

3. A recording apparatus according to claim 1, further comprising a deletion instruction unit configured to issue an instruction to delete a part of moving image data recorded on the recording medium, the deletion instruction unit determines the part of the moving image data to be deleted in accordance with the unit of time length, wherein the management unit changes a content of the management information in response to the instruction from the deletion instruction unit.

4. A recording apparatus according to claim 1, wherein the setting means selects the unit of time length from among a plurality of predetermined time lengths.

5. A recording apparatus according to claim 1, further comprising a display unit configured to display an information indicative of the unit of time length set by the set means during recording of the moving image data.

6. A recording apparatus according to claim 1, wherein the recorder records an information indicative of the unit of time length set by the setting means on the recording medium.

7. An imaging apparatus comprising:
- an imaging unit configured to generate moving image data including a plurality of frames;
- setting means for setting an unit of time length of the moving image data, the unit of time length including at least one frame of the moving image data;
- a time length instruction unit configured to provide an instruction for changing the unit of time length, the setting means changing the unit of time length in accordance with the instruction for changing the unit of time length provided by the time length instruction unit;
- a recorder configured to record a moving image file including the moving image data on a recording medium including a plurality of clusters, the recorded moving image data of one moving image file including a plurality of the units of time length set by the setting means;
- a management unit configured to generate management information containing a link information indicating a cluster number of the moving image data to be reproduced next with respect to a plurality of clusters in which the moving image data are recorded; and
- a controller configured to control the recorder in accordance with the unit of time length set by the setting means so as to record a front frame of each of the plurality of units of time length included in the moving image data of one moving image file on a front of a cluster of the recording medium.

8. A method for controlling a recording apparatus having a recording unit, the method comprising:
- setting a unit of time length of moving image data including a plurality of frames, the unit of time length including at least one frame of the moving image data;
- changing the unit of time length in accordance with an instruction for changing the unit of time length provided by a time length instruction unit;
- controlling the recording unit to record a moving image file including the moving image data on a recording medium including a plurality of clusters, the recorded moving image data of one moving image file including a plurality of the units of time length;
- generating management information containing a link information indicating a cluster number of the moving image data to be reproduced next with respect to a plurality of clusters in which the moving image data are recorded; and
- controlling the recording unit in accordance with the unit of time length so as to record a front frame of each of the plurality of units of time length included in the moving image data of one moving image file on a front of a cluster of the recording medium.

* * * * *